United States Patent Office 3,308,038
Patented Mar. 7, 1967

3,308,038
PROCESS OF MAKING SPORE-CONTAINING CULTURES OF JAPANESE BEETLE MILKY DISEASE BACTERIA

Robert A. Rhodes, George R. Hrubant, and Margaret S. Roth, Peoria, Ill., assignors to the United States of America as represented by the Secretary of Agriculture No Drawing. Filed Nov. 13, 1964, Ser. No. 411,161
3 Claims. (Cl. 195—96)

A nonexclusive, irrevocable, royalty-free license in the invention herein described, throughout the world for all purposes of the United States Government, with the power to grant sublicenses for such purposes, is hereby granted to the Government of the United States of America.

This invention relates to a commercially promising in vitro process for reproducibly obtaining appreciable extents of sporulated cell formation in agar plate colonies of *Bacillus popilliae* that have been plated from vegetative cultures of the organism, the in vitro-generated spores being not only apparently capable of producing the highly fatal milky disease when injected into Japanese beetle larvae but also being capable of producing vegetative cultures, injections of which are highly pathogenic for the larvae of the Japanese beetle, *Popillia japonica* Newman, thereby simplifying the reproducible provision of *Bacillus popilliae* cells needed for sporogenesis studies that may lead to extensive commercial in vitro production of viable, highly infective spores for the biological control of the Japanese beetle in place of the scarce and costly spore-containing powdered tissue obtained upon the death of laboriously injected Japanese beetle larvae.

Nearly three decades ago Dutky discovered that the highly lethal milky disease of Japanese beetles is caused therein by ingestion of infective spores of two closely related bacteria, namely *Bacillus popilliae* and *Bacillus lentimorbus*. Dutky also conceived and developed the only presently available biological control agent by injecting hand collected Japanese beetle larvae with viable spores of the above pathogens, allowing the larvae to die from the resulting growth of billions of bacterial cells therein, then dessicating the spore-containing dead larvae, and grinding their tissue to a dispersable infective powder.

Despite extensive research by many qualified microbiologists, it has heretofore been impossible to reproducibly obtain any in vitro formation of sporulated rather than exclusively vegetative *Bacillus popilliae* cells, thereby greatly hampering in vitro efforts to study the sporogenesis of the milky disease bacteria which, sporulation in nature occurs only in the body of the infected Japanese beetle larvae where, following a prolonged latency, sporulation occurs very explosively shortly before the death of the host. While the maintenance of milky disease bacterial spores in dried films of infected *Popillia japonica* hemolymph provides a water dispersible material that is infective when injected directly into the hemocoeles of Japanese beetle larvae, such prior art materials do not represent pure cultures in the microbiological sense, are not suitable as stock inocula for readily producing vegetative cultures of the milky disease microorganisms, and do not provide a means for studying the very complex sporogenesis of the milky disease bacteria that may lead to large scale in vitro sporulation and less costly products for the biological control of the detested Japanese beetle.

A major object of our invention is an in vitro microbiological process for obtaining pure cultures of Japanese beetle milky disease bacteria that consistently comprise an appreciable proportion of viable and infective sporulated cells.

Another object is an in vitro process for reproducibly culturing storage and heat-resistant spore-containing colonies of certain strains of milky disease bacteria, which spore-containing material can be employed both as an inexpensive and effective inoculum for bulk scale fermentations of infective vegetative cells of the milky disease bacteria and as a dependable source of a viable spore-containing material that may permit a widespread biological control program.

Other and related objects will become apparent from the following detailed disclosure and claims.

In accordance with the broad objects of our invention we have now discovered an in vitro technique for reproducibly obtaining limited but highly useful extents of sporulation (about 3 percent to as high as about 5 percent of the total cell population being in the spore form) of certain pure strains of Japanese milky disease organisms, which viable bacterial spores are resistant to heat and to dehydration, do not require frequent serial transfers to preserve viability as do the corresponding vegetative cell, and that constitute a convenient inoculum for the extensive propagation of the pathogenic vegetative form of the organism in liquid media. Thus, it has now been found that appreciable and useful extents of sporulated *Bacillus popilliae* are reproducibly formed when the lyophilized vegetative cells of certain specific substrains of *Bacillus popilliae,* i.e., NRRL B–2309L and NRRL B–2309S that we have isolated from plate cultures of the known "wild type" strain NRRL B–2309 are first cultured for 18–24 hours in shaken flasks or with aeration at the rate of at least 0.15 v./v./min. and up to 0.5 v./v./min. in an aqueous medium critically containing as separately autoclaved constituents 0.2 percent of a fermentable carbohydrate such as glucose, fructose, or trehalose, 1.5–2.0 percent of commercially available unfractionated yeast extract, and sufficient $K_2HPO_4$ buffer to initially provide a pH of 7.2 to 7.5 (0.3% provides a pH of 7.3), then sparingly inoculating the surface of carbohydrate-free acetate-agar plates with 0.3 ml. of a $10^7$ dilution (using 0.1% tryptone as diluent) of the exclusively vegetative cell culture, said plates having been prepared by adding to an autoclaved solution containing 2.0 percent of prewashed agar and 1.5 to 2.0 percent of yeast extract a separately autoclaved mixture containing 0.035 to 0.070 percent (w./v.) of sodium acetate and 0.3 percent of $K_2HPO_4$ likewise based on the solution, which thusly formed carbohydrate-free acetate-agar medium avoids the formation of an inhibitor substance, at most within several hours after inoculating the plates, overlaying the same with 5 ml. of an autoclaved 1 percent solution of granular agar that was first exhaustively washed in 10–12 changes of deionized water, incubating the overlayed inoculated plates at 30° C. for about 42 days to obtain colonial growth, at which time microscopic counts show that only when the plates have been sparingly inoculated as to provide not more than about 30 uncrowded colonies per plate, proportions amounting to about 3 percent to about 5 percent of the total bacterial cell count of the otherwise exclusively vegetative colonies are in the spore form. Suspensions of the spore-containing material, which may be given even greater ability to germinate by subjection to thenmal shock at 50° C. for 15 minutes, may cause milky disease when sufficient viable cells are injected into Japanese beetle larvae, and can be employed as an available inoculum for the growth of pathogenic vegetative cultures.

The following particulars will contribute to a better understanding and employment of the above technique. Contrary to Dutky's teaching in Steinhaus' (Ed.) "Insect Pathology," vol. 2, pp. 75–115, Academic Press (1963) to the effect that *Bacillus popilliae* organisms are anaerobic, we have found that substrains NRRL B–2309L and NRRL B–2309S require oxygen and that their rate of growth in liquid culture is directly proportional to the supply of oxygen-containing air, the minimum required aeration being equivalent to 0.15 v./v./min. Aerations exceeding 0.5 v./v./min. do not further increase the rate or extent of growth, and are particularly undesirable since in aqueous media increased rates and extents of vegetative proliferation result in diminished viability and necessitate more frequent serial transfers to prevent loss of the organism, which ordinarily promptly loses viability on reaching a late log phase population of about $5 \times 10^8$ viable vegetative cells per ml.

EXAMPLE

Lyophilized vegetative cells of isolated strains of *Bacillus popilliae* NRRL B–2309L and *Bacillus popilliae* NRRL B–2309S were cultured in respective 500 ml. Erlenmeyer flasks each containing 100 ml. of a distilled water basal medium containing 1.5 percent of separately autoclaved yeast extract obtained from an established supplier of microbiological media, 0.3 percent $K_2HPO_4$, and 0.2 percent glucose. The sterilized triplicate flasks for each strain were incubated at 30° C. on a rotary shaker until the late log phase cell populations reached a value of about $5 \times 10^8$ vegetative cells per ml. (16–24 hours depending on the rate of agitation, i.e., aeration). Then without substantial delay (serial transfer and reculture otherwise being required), 0.3 ml. portions of the respective vegetative cultures that had just been diluted 10-million fold ($10^7$) with a 0.1 percent tryptone solution were spread on triplicate acetate-agar plates in which the medium had been prepared by adding to a distilled water solution containing 1.5 percent of the said separately autoclaved yeast extract and 0.1 percent $K_2HPO_4$, 2.0 percent of deionized water-washed agar, and 0.070 percent (w./v.) of $CH_3COONa$ before sterilizing. The acetate agar plates (35 ml. before solidification) had a pH of 7.2–7.4. The seeded plates were then promptly overlayed with 5 ml. of a 1 percent solution of washed agar and incubated for 42 days at 30° C., during which period the colonial growth thereon was periodically examined for the typical refractile spores and paraspores by phase microscopy and in stained preparations. Significant sporulation did not occur until the last few days of the 6-week period, but pre-sporulation swellings were observed considerably sooner. Sporulation of *Bacillus popilliae* NRRL B–2309L and *Bacillus popilliae* NRRL B–2309S occurs only if the vegetative colonies are widely spaced and there are not more than about 30 colonies per plate, the latter being controlled by proper dilutions of the liquid culture population per ml.; under the described conditions about 3 percent of the colonial B–2309S cells and up to 5 percent of the B–2309L cells are found to have become spores after 6 weeks incubation.

Appreciable spore formation occurred only in the presence of a proper amount of added sodium acetate, concentrations above 17 mM. being somewhat inhibitory. Colony formation, however, was not dependent on the presence or absence of acetate in the agar medium. Similarly, colony formation is not influenced by the presence or absence of fermentable carbohydrate, but spore formation is severely restricted by even small amounts of glucose in the acetate agar. Trehalose is considerably less inhibitory to sporulation by *Bacillus popilliae* than is glucose. Bacto-agar contents outside the range of 1.5–2.5 percent in the original solid medium layer markedly reduced the extent of sporulation, as did the substitution of other agars. Likewise, increasing the yeast extract concentration from the operative level of 1.5 percent to a concentration of 2.0 percent completely prevented spore formation while lowering the yeast extract concentration to 1.0 percent distinctly depressed sporulation. Substitutions of yeast extract fractions were of little or no value, and the whole or partial substitution of other organic sources of nitrogen for yeast extract in the acetate agar invariably restricted either growth or sporulation.

Subjecting suspensions of the obtained exemplary spore-containing colony materials to a temperature of 50° C. for 15 minutes expectedly killed the vegetative cells but improved the germinability of the spores. Vegetative cells of liquid cultures established from the germinated spores were shown to be pathogenic for milky disease when injected into healthy Japanese beetle larvae.

Having fully disclosed our invention we claim:

1. An in vitro process for inducing sporulation to the extent of about 3 percent to about 5 percent based on the total number of Japanese beetle milky disease bacterial cells present in the form of discrete colonies grown on a solid culture medium, said process comprising inoculating a distilled water medium containing 1.5 percent by weight of separately autoclaved yeast extract, 0.3 percent dipotassium phosphate buffer, and 0.2 percent of a fermentable carbohydrate selected from the group consisting of trehalose, glucose, and fructose with viable vegetative cells obtained by liquid culture of a Japanese beetle milky disease organism selected from the group consisting of *Bacillus popilliae* NRRL B–2309L and *Bacillus popilliae* NRRL B–2309S, fermenting the inoculated medium at 30° C. in the presence of aeration equivalent to 0.15–0.5 v./v./min. until the resulting vegetative cells reach a late log phase population of about $5 \times 10^8$ cells per ml., promptly diluting a small amount of the fermented liquid medium with $10^7$ volumes of a 0.1-percent tryptone solution, spreading 0.3 ml. aliquots of the diluted fermentation medium on the surface of each of replicated solid media plates prepared by adding as separately autoclaved components 0.10 percent to 0.150 percent by weight of $K_2HPO_4$ based on the aqueous solution and 0.035 percent to 0.070 percent (w./v.) of sodium acetate to a distilled water solution containing 1.5 percent of yeast extract and 2.0 percent of agar, promptly overlaying the thusly inoculated plates with 5 ml. of an autoclaved 1-percent solution of exhaustively washed agar, incubating the overlaid plates at 30° C. for 42 days whereby to obtain not more than about 30 colonies per plate in which colonies about 3 percent to about 5 percent of the individual cells thereof are in the spore form, subjecting suspensions of the above colonial material to heating for 15 minutes at 50° C. to kill the vegetative cells and provide an agar plate having thereon only sporulated cells of a said Japanese beetle milky disease organism, said sporulated cells having improved germinability.

2. The process of claim 1 wherein the milky disease organism is *Bacillus popilliae* NRRL B–2309S, the fermentable carbohydrate is glucose, and the aeration rate is 0.50 v./v./min.

3. The process of claim 1 wherein the milky disease organism is *Bacillus popilliae* NRRL B–2309L, the fermentable carbohydrate is glucose, and the aeration rate is 0.50 v./v./min.

No references cited.

A. LOUIS MONACELL, *Primary Examiner.*

L. M. SHAPIRO, *Assistant Examiner.*